United States Patent [19]

Yoshida et al.

[11] Patent Number: 4,464,692
[45] Date of Patent: Aug. 7, 1984

[54] MAGNETIC SHEET CASSETTE DEVICE

[75] Inventors: Shigeru Yoshida, Chichibu; Yasuo Kawai, Kawasaki, both of Japan

[73] Assignee: Canon Kabushiki Kaisha, Tokyo, Japan

[21] Appl. No.: 292,594

[22] Filed: Aug. 13, 1981

[30] Foreign Application Priority Data

Aug. 27, 1980 [JP] Japan .............................. 55-117001

[51] Int. Cl.³ .............................................. G11B 23/02
[52] U.S. Cl. ................................................... 360/133
[58] Field of Search ...................... 360/133, 97.99, 60

[56] References Cited

U.S. PATENT DOCUMENTS 3,931,644  1/1976  Ward ..................................... 360/133
3,950,786  4/1976  Shapley ................................. 360/60
4,277,810  7/1981  Helmrich .............................. 360/133

Primary Examiner—John H. Wolff
Attorney, Agent, or Firm—Fitzpatrick, Cella, Harper & Scinto

[57] ABSTRACT

A magnetic sheet cassette device consisting of a rigid casing and a magnetic sheet housed therein, featured in having cavities between the recording faces of the magnetic sheet and the casing for preventing abrasion or damage by bending of the recording faces, featured further in having plural apertures in the casing corresponding to the index hole of the magnetic sheet in order to allow detection thereof with a single photocoupler even when the cassette device is inverted, and featured in having an aperture for prohibiting information write-in in a part of the cassette device in order to prevent erroneous erasure of the recorded information.

9 Claims, 5 Drawing Figures

MAGNETIC SHEET CASSETTE DEVICE

BACKGROUND OF THE INVENTION

1. Field of the Invention

The present invention relates to a magnetic sheet cassette device provided with a magnetic sheet having magnetic recording faces, and with a cavity area of preventing contact with said recording faces.

2. Description of the Prior Art

As shown in FIG. 1, there is already known a flexible jacket 14, such as employed in a floppy disk, for housing a flexible magnetic sheet 13 having recording faces composed of plural concentric recording tracks, and provided with an unrepresented non-woven cloth or the like between said magnetic sheet 13 and the jacket 14. Such a flexible jacket, though having the advantage of a thin shape, is easily bent, thus simultaneously bending the housed magnetic sheet and eventually damaging the recording faces thereof or disabling satisfactory information read-out therefrom. Also the above-mentioned non-woven sheet has a drawback of causing abrasion on the recording faces of the magnetic sheet in friction contact therewith.

SUMMARY OF THE INVENTION

A first object of the present invention is to provide a magnetic sheet cassette device capable of preventing the damage by bending of the magnetic sheet housed in the cassette device.

A second object of the present invention is to provide a magnetic sheet cassette device capable of preventing the abrasion of the recording faces of the magnetic sheet.

A third object of the present invention is to provide a magnetic sheet cassette device allowing information recording on both faces of the magnetic sheet.

A fourth object of the present invention is to provide a magnetic sheet cassette device capable of preventing erroneous erasure of recorded information.

DETAILED DESCRIPTION OF THE PREFERRED EMBODIMENTS

Now the present invention will be clarified in detail by the embodiments thereof shown in the attached drawings.

Figure 1:
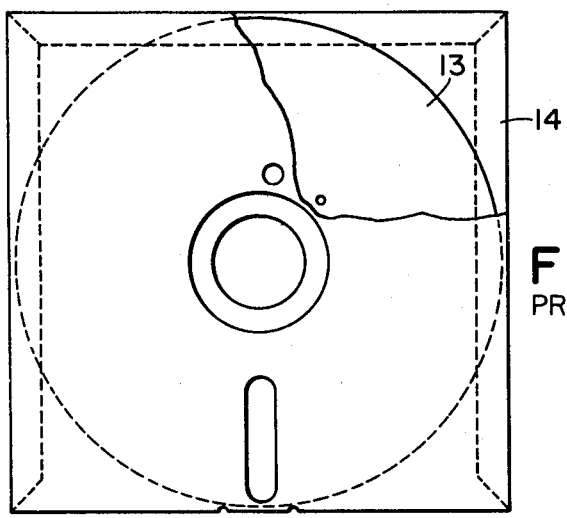
FIG. 1 is a plan view of a conventional jacket.
Figure 2:
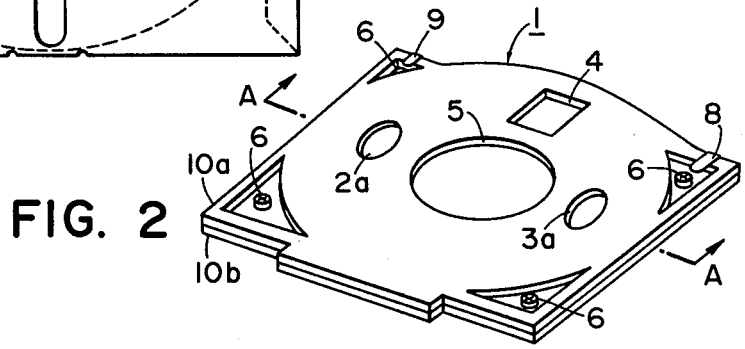
FIG. 2 is a schematic perspective view of the magnetic sheet cassette of the present invention.
Figure 3:
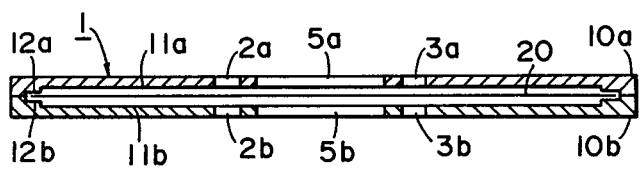
FIG. 3 is a cross-sectional view along the line A—A in FIG. 2.
Figure 4:
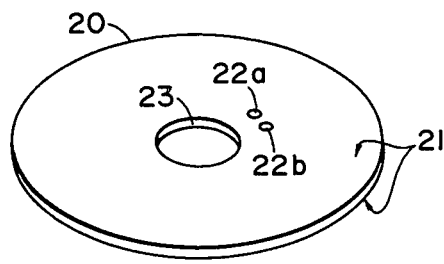
FIG. 4 is a perspective view of a magnetic sheet to be housed in the magnetic sheet cassette shown in FIG. 2.

As shown in FIGS. 2 and 3, the magnetic sheet cassette 1 of the present invention is composed of an upper casing member 10a and a lower casing member 10b which are both made of a rigid plastic material to have a total thickness of 2 to 3 mm and which are provided with corresponding positioning apertures 2a, 2b, 3a and 3b, magnetic head windows 4 exposing the recording faces 21 of a disk-shaped magnetic sheet 20 (cf. FIG. 4) and center holes 5a, 5b for engaging with unrepresented drive means for driving said magnetic sheet. It will be understood that said magnetic head window is also provided in the lower casing member though it is not clearly shown in the drawing. Also as shown in FIG. 3, said upper and lower casing members are provided, on the mutually facing internal faces thereof, with disk-shaped shallow cavities 11a, 11b and grooves 12a, 12b positioned around and shallower than said cavities 11a, 11b. The diameter of said grooves 12a, 12b is selected slightly larger than the diameter of the magnetic sheet 20, and the diameter of said cavities 11a, 11b is selected substantially equal to the diameter of the recording face 21 of said magnetic sheet 20. In this manner the recording faces 21 are not abraded because of the absence of contact with the cassette 1.

The center holes 5a, 5b, provided substantially in the center of the upper and lower casing members 10a, 10b for clamping of the magnetic sheet 20, are shaped somewhat larger than a center hole 23 provided in the center of the magnetic sheet 20.

Figure 5:
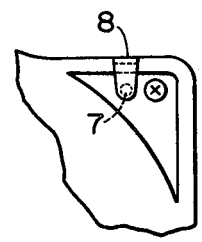
FIG. 5 is a magnified plan view showing a corner portion of the cassette shown in FIG. 2.

The positioning apertures 2a, 2b provided in the upper and lower casing members 10a, 10b are positioned corresponding to index holes 22a, 22b formed on the magnetic sheet 20 for indicating the rotational position thereof. In case there are provided two sets of positioning apertures as shown in the drawings, said apertures 2a, 2b, 3a and 3b are to be positioned symmetrically with respect to a line connecting the center holes 5a, 5b with the center of the magnetic head windows 4. In this manner it is rendered possible to use the magnetic sheet and the magnetic sheet cassette on either face thereof. The upper and lower casing members 10a, 10b are mutually fixed by screws 6. In the illustrated embodiment there are provided four screws 6 at the corners. Also as shown in FIG. 5, the upper casing member 10a is provided, in a portion distant from the magnetic sheet, for example in two lateral edges thereof, with write-protect holes 7 for prohibiting information write-in operation for preventing erroneous erasure of the recorded information, and said write-protect holes 7 are closed by protruding members 8, 9 fixed or integrally formed on the casing. When said holes 7 are exposed by destructing or removing said protruding members 8, 9, the data recorded on the magnetic sheet cannot be erased while the magnetic sheet cassette is driven on a drive unit.

The magnetic sheet 20 is positioned in the cavities 11a, 11b of the magnetic sheet cassette device of the above-explained structure in such a manner that the periphery of said magnetic sheet 20 is supported by said grooves 12a, 12b. Subsequently the upper and lower casing members 10a, 10b are mutually fixed by the screws 6 after the apertures 2a, 2b; 3a, 3b, magnetic head windows 4 and center holes 5a, 5b are mutually aligned. Upon mounting thus constructed magnetic sheet cassette on a drive unit, the magnetic sheet 20 is rotated for information write-in or read-out to or from the recording faces thereof by means of unrepresented magnetic heads positioned corresponding to said magnetic head windows.

As explained in the foregoing, the magnetic sheet cassette device of the present invention, being provided with a rigid casing having shallow cavities for preventing contact of the recording faces of the magnetic sheet with the casing, prevents the eventual bending of the magnetic sheet at the mounting on or removal from the drive unit, thus maintaining intact recording faces and ensuring secure information read-out and write-in.

What we claim is:

1. A sheet cassette device, comprising:
    a disk shaped sheet having opposed recording faces thereon and an outer peripheral portion; and
    a cassette casing for accommodating said sheet therein, said casing defining a chamber having a support portion and a cavity portion, the support portion being dimensioned to rotatably support said sheet at the peripheral portion thereof, the cavity portion being dimensioned to accommodate the recording faces of said sheet therein such that the recording faces are spaced from said casing.

2. A sheet cassette device according to the claim 1, wherein said casing includes an aperture for permitting insertion of drive means for driving said sheet.

3. A sheet cassette device according to the claim 1, wherein said casing includes an aperture for permitting insertion of at least one of means for information write-in to and means for information read-out from the recording faces of said sheet.

4. A sheet cassette device according to the claim 1, wherein said casing includes at least one aperture for detecting the rotational position of said sheet.

5. A sheet cassette device according to claim 1, wherein said disk shaped sheet further includes a plurality of small apertures for indicating the position of said sheet, said cassette casing also having a large aperture arranged and sized to expose simultaneously said plurality of small apertures.

6. A sheet cassette device according to claim 5, wherein casing further includes a first aperture for permitting insertion of driving means for driving said sheet and a second aperture for permitting insertion of information-converting means for receiving and transmitting information from and to the sheet.

7. A sheet cassette device according to claim 1, wherein said cassette casing includes means for precluding erasure of information on the recording faces of said disk shaped sheet, said precluding means being provided in an area remote from the cavity portion accommodating said disk shaped sheet.

8. A sheet cassette device, comprising:
    a sheet having recording faces for recording information thereon, and having an index aperture for indicating the position of said sheet; and
    a cassette casing for accommodating said sheet therein, said casing defining a chamber having a support portion and a cavity portion, the support portion being dimensioned to rotatably support said sheet at the peripheral portion thereof, the cavity portion being dimensioned to accommodate the recording faces of said sheet therein such that the recording faces are spaced from said casing, said casing having a plurality of apertures including a first aperture sized for insertion therein of drive means for driving said sheet, a second aperture sized for insertion therein of information converting means for receiving and transmitting information from and to the recording faces, and a third aperture for exposing the index aperture of said sheet.

9. A sheet cassette device according to the claim 8, wherein said third aperture includes a plurality of apertures positioned approximately symmetrically with respect to a line connecting said first and second apertures and positioned to expose the index aperture.

* * * * *